(12) United States Patent
Nielsen et al.

(10) Patent No.: US 8,290,867 B2
(45) Date of Patent: *Oct. 16, 2012

(54) MICRO-PAYMENT SYSTEM ARCHITECTURE

(75) Inventors: Thomas Alan Nielsen, San Francisco, CA (US); John Dominick Piscitello, San Francisco, CA (US); Arturo E. Crespo, Sunnyvale, CA (US); Louis Vincent Perrochon, Mountain View, CA (US); Benjamin Chan-Bin Ling, San Jose, CA (US); Georges Harik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/360,650

(22) Filed: Jan. 27, 2012

(65) Prior Publication Data

US 2012/0130855 A1 May 24, 2012

Related U.S. Application Data

(63) Continuation of application No. 13/217,152, filed on Aug. 24, 2011, now Pat. No. 8,108,306, which is a continuation of application No. 10/997,227, filed on Nov. 24, 2004, now Pat. No. 8,027,918.

(60) Provisional application No. 60/605,794, filed on Aug. 30, 2004.

(51) Int. Cl.
*G06Q 40/00* (2012.01)
(52) U.S. Cl. ............................................. 705/40; 705/35
(58) Field of Classification Search .................. 705/40, 705/35
See application file for complete search history.

(56) References Cited

U.S. PATENT DOCUMENTS 7,111,078 B2 9/2006 Keorkunian et al.

*Primary Examiner* — Thomas Dixon
*Assistant Examiner* — Benjamin S Fields
(74) *Attorney, Agent, or Firm* — Fenwick & West LLP

(57) ABSTRACT

A micro-payment system has buyers, sellers, and a broker. The buyers establish accounts with the broker and provide payment information allowing the broker to invoice the buyers. The sellers establish accounts with the brokers and specify terms for accessing items, including electronic content, available from the sellers. The sellers also provide payment information that allows the broker to credit the sellers for sales of the items. The broker aggregates the buyers' micro-payment purchases and invoices the buyers. The broker also aggregates the sellers' micro-payment sales and credits the sellers.

20 Claims, 5 Drawing Sheets

MICRO-PAYMENT SYSTEM ARCHITECTURE

CROSS-REFERENCE TO RELATED APPLICATIONS

This application is a continuation of U.S. patent application Ser. No. 13/217,152, filed Aug. 24, 2011, which is a continuation of U.S. patent application Ser. No. 10/997,227, filed Nov. 24, 2004, which claims the benefit of U.S. Provisional Application No. 60/605,794, filed Aug. 30, 2004. Each of these applications is incorporated herein in its entirety.

BACKGROUND OF THE INVENTION

1. Field of the Invention

This invention pertains in general to delivery of electronic content and services over a network such as the Internet and pertains in particular to a system supporting micro-payment mechanisms for the content and services.

2. Description of the Related Art

Electronic commerce on the Internet has become commonplace. There are many sellers offering goods and services via web sites on the Internet, and there are an even greater number of buyers who purchase the goods and services. In many cases, the electronic commerce transactions involve physical goods. For example, many buyers purchase items such as books, compact disks (CDs) and DVDs via the Internet. Buyers can also purchase electronic content such as downloadable text and/or music and access to web sites that provide news or entertainment stories.

Most electronic commerce sites on the Internet use ad hoc purchasing systems. For example, a web-based music seller typically has a purchasing system that is valid for only that seller's family of web sites. Likewise, a seller of web-based electronic content, such as newspaper stories, typically has a purchasing system that is valid for only the web site providing the content.

Therefore, a buyer must establish an account and/or provide payment information to each seller that the buyer patronizes. These separate accounts are inconvenient to both the seller and buyer. The seller must maintain a dedicated account management and payment system. The buyer must establish separate accounts, and the attendant login and password information, with numerous sellers. Moreover, the buyer must engage in risky behavior, such as providing a credit card number to relatively unknown sellers, in order purchase items.

The problems described above are especially apparent if the buyer purchases relatively inexpensive items, such as newspaper stories that cost only a few cents each. These types of transactions are frequently referred to as "micro-payments." The transaction cost for most payment methods, including credit cards, make the methods impractical for use with individual micro-payment transactions. Therefore, there is a need in the art for an electronic commerce system that supports micro-payments and other types of transactions, but does not suffer from the limitations described above.

BRIEF SUMMARY OF THE INVENTION

The above need is met by a micro-payment system utilizing a broker. In one embodiment, the micro-payment system has multiple buyers and multiple sellers interacting with at least one broker. The buyers establish accounts with the broker and provide payment information allowing the broker to invoice the buyers for aggregate micro-payment transactions. The sellers establish accounts with the brokers and specify terms for accessing items, including electronic content, available from the sellers. The sellers also provide payment information that allows the broker to credit the sellers for their sales.

The buyers interact with the broker to purchase items from the sellers in exchange for micro-payments. The broker aggregates the buyers' micro-payment transactions and invoices the buyers for the aggregate amounts of their transactions. The broker also aggregates the sellers' micro-payment sales and credits the sellers for the aggregate amount of their sales.

BRIEF DESCRIPTION OF THE DRAWINGS

FIG. 4 is a high-level block diagram illustrating modules within the broker of

FIG. 1 according to one embodiment of the present invention.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

A. OVERVIEW

Figure 1:
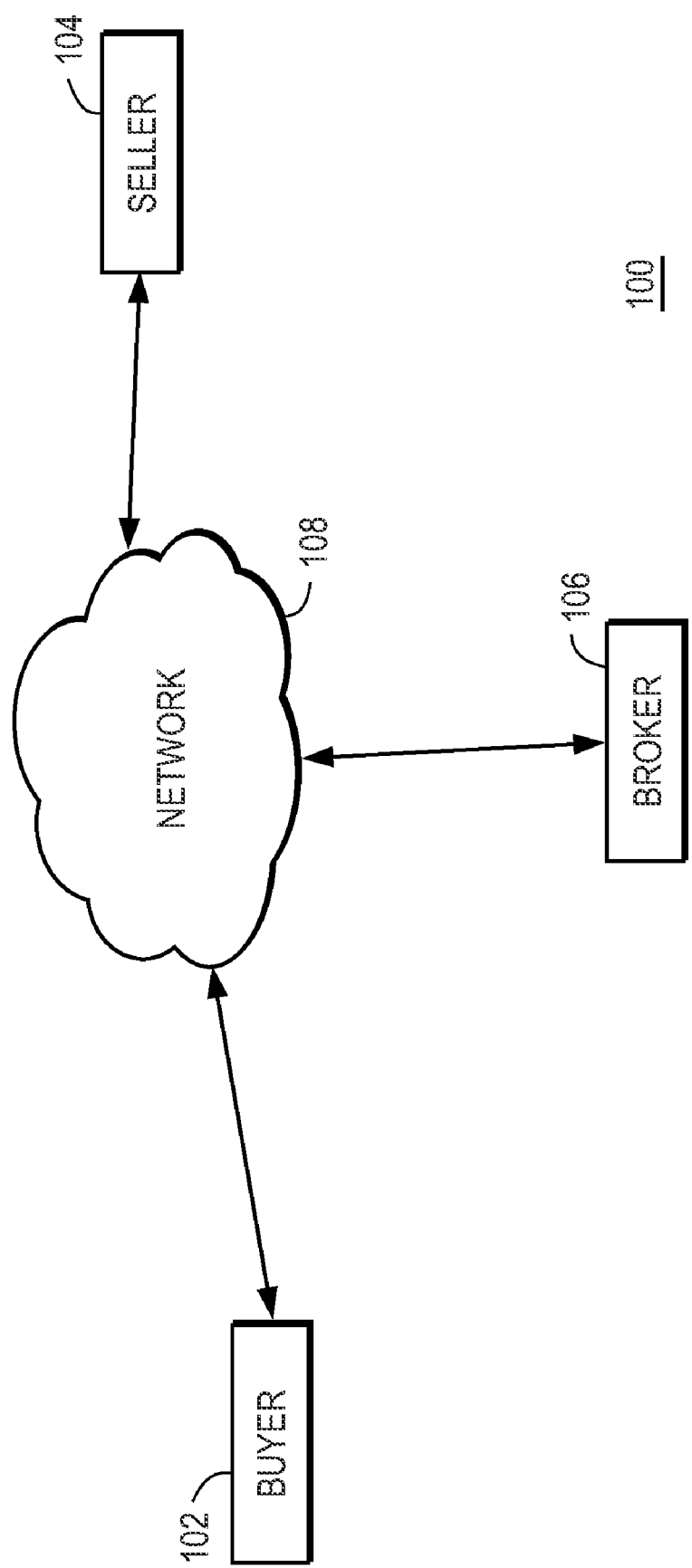
FIG. 1 is a high-level block diagram of a computing environment according to one embodiment of the present invention.

FIG. 1 is a high-level block diagram of a computing environment 100 according to one embodiment of the present invention. FIG. 1 illustrates a buyer 102, a seller 104, and a broker 106 connected by a network 108.

The buyer 102 in this embodiment represents an entity that obtains items via the network 108 through purchases or other types of transactions. For purposes a clarity, the entity receiving the item from the seller is referred to as the "buyer" and the transaction is referred to as a "sale" or "purchase." As used herein, these terms also refer to other types of transactions, regardless of whether the entity is technically a "buyer" or the transaction is technically a "sale."

In one embodiment, the buyer 102 includes a computer system that is utilized by an end-user to communicate with other computers on the network 108 in order to effect a purchase. The computer system, for example, can be a personal computer executing a web browser such as MICROSOFT INTERNET EXPLORER that allows the end-user to retrieve and display content from web servers and other computer systems on the network 108. In other embodiments, the buyer includes a network-capable device other than a computer system, such as a personal digital assistant (PDA), a cellular telephone, a pager, a television "set-top box" etc. Although FIG. 1 illustrates only a single buyer 102, embodiments of the present invention can have thousands or millions of buyers participating in the electronic commerce system described herein. The single buyer 102 is illustrated in order to simplify and clarify the present description. As used herein, the reference number 102 refers to both a single buyer and/or a set of buyers, depending upon the context.

Similarly, the seller 104 represents an entity that makes items available on the network 108 via a sale or other type of transaction. For purposes a clarity, the entity offering the item to the buyer is referred to as the "seller" and the transaction is referred to as a "sale" or "purchase." As used herein, these terms also refer to other types of transactions, regardless of whether the entity is technically a "seller" or the transaction is technically a "sale."

In one embodiment, the seller 104 includes a computer system acting as a web server that is utilized by the seller to offer the items to potential buyers 102. The items offered by the seller 104 can include tangible items such as books, CDs, DVDs, electronic goods, etc. The items offered by the seller 104 can also include intangible items such as services and electronic content such as web pages, downloadable files, streaming media, etc. For purposes of simplicity and clarity, the remainder of this description assumes the seller is selling electronic content. However, one of ordinary skill in the art will understand that many different types of items (both tangible and intangible) can be sold by the seller. Although FIG. 1 illustrates only a single seller 104, embodiments of the present invention can have many sellers participating in the electronic commerce system described herein. The single seller 104 is illustrated in order to simplify and clarify the present description. As used herein, the reference number 104 refers to both a single seller and/or a set of sellers, depending upon the context.

In one embodiment, the seller 104 sells an item for a relatively inexpensive amount called a "micro-payment." As used herein, the term "micro-payment" refers to a partial or small amount of currency. The exact value of a micro-payment depends upon the individual transaction. In one United States embodiment, a typical range for a micro-payment is a fraction of a cent to a few dollars. However, the term "micro-payment" also covers transactions involving smaller or larger payments.

The broker 106 represents an entity that serves as an intermediary for the transaction between the buyer 102 and the seller 104. In one embodiment, the broker 106 operates a web site that the buyer 102 can visit using a web browser and view items for sale by sellers 104. The broker 106 provides an electronic commerce payment infrastructure that allows buyers 102 and sellers 104 to efficiently engage in micro-payment transactions. Although FIG. 1 illustrates only a single broker 106, embodiments of the present invention can have multiple brokers participating in the electronic commerce system described herein. The single broker 106 is illustrated in order to simplify and clarify the present description.

The network 108 represents the communication pathways between the buyer 102, seller 104, and broker 106. In one embodiment, the network 108 is the Internet. The network 108 can also utilize dedicated or private communications links that are not necessarily part of the Internet. In one embodiment, the network 108 uses standard communications technologies and/or protocols. Thus, the network 108 can include links using technologies such as 802.11, integrated services digital network (ISDN), digital subscriber line (DSL), asynchronous transfer mode (ATM), etc. Similarly, the networking protocols used on the network 108 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. The data exchanged over the network 108 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

In one embodiment, a seller 104 uses the network 108 to establish an account with the broker 106 and specify terms for accessing content available from the seller. The seller 104 also provides payment information that allows the broker 106 to credit the seller 104. The broker 106 indexes the content available from the seller 104. The broker 106 also provides searching functionality that allows relevant indexed content to be identified in response to a search.

A buyer 102 uses the network to establish an account with the broker 106 and provide payment information, such as a credit card number, that allows the broker 106 to invoice the buyer 102. A buyer 102 uses the broker's search functionality to search for content available from sellers 104. When a buyer 102 indicates a desire to receive content available from a seller 104, the broker 106 provides the seller's content to the buyer. The broker 106 uses the buyer's payment information to charge the buyer a fee for accessing the content and uses the seller's payment information to share the fee with the seller 104.

B. SYSTEM ARCHITECTURE

Figure 2:
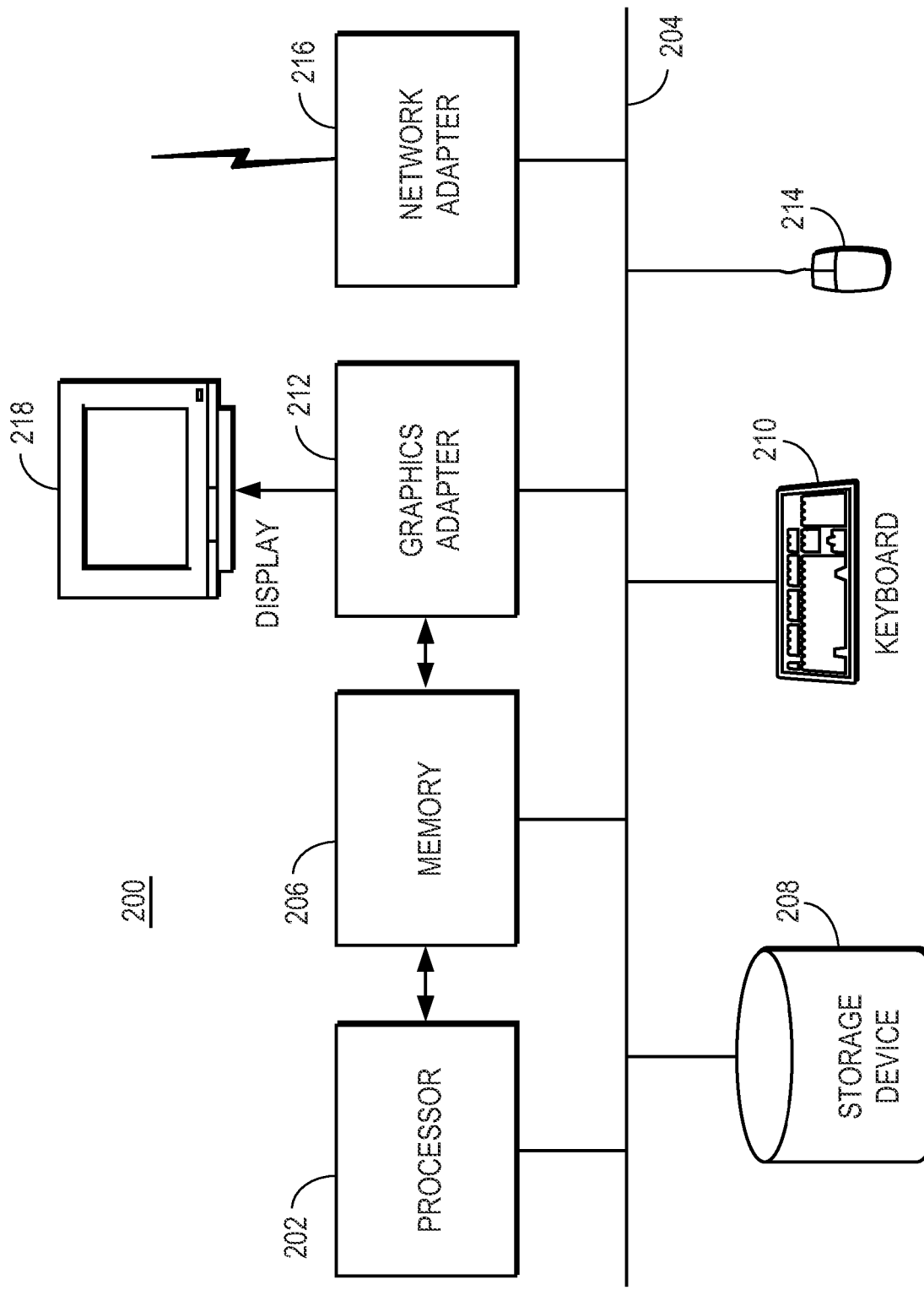
FIG. 2 is a high-level block diagram illustrating a functional view of a typical computer system for use as one of the entities illustrated in the environment of FIG. 1 according to an embodiment of the present invention.

FIG. 2 is a high-level block diagram illustrating a functional view of a typical computer system 200 for use as one of the entities illustrated in the environment 100 of FIG. 1 according to an embodiment of the present invention. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 108.

As is known in the art, the computer system 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computer systems 200 utilized by the varies entities of FIG. 1 can vary depending upon the embodiment and the processing power utilized by the entity. For example, the buyer 102 typically requires less processing power by the seller 104 and broker 106. Thus, the buyer computer system can be a standard personal computer system. The seller and broker computer systems, in contrast, may comprise more powerful computers and/or multiple computers working together to provide the functionality described herein.

Figure 3:
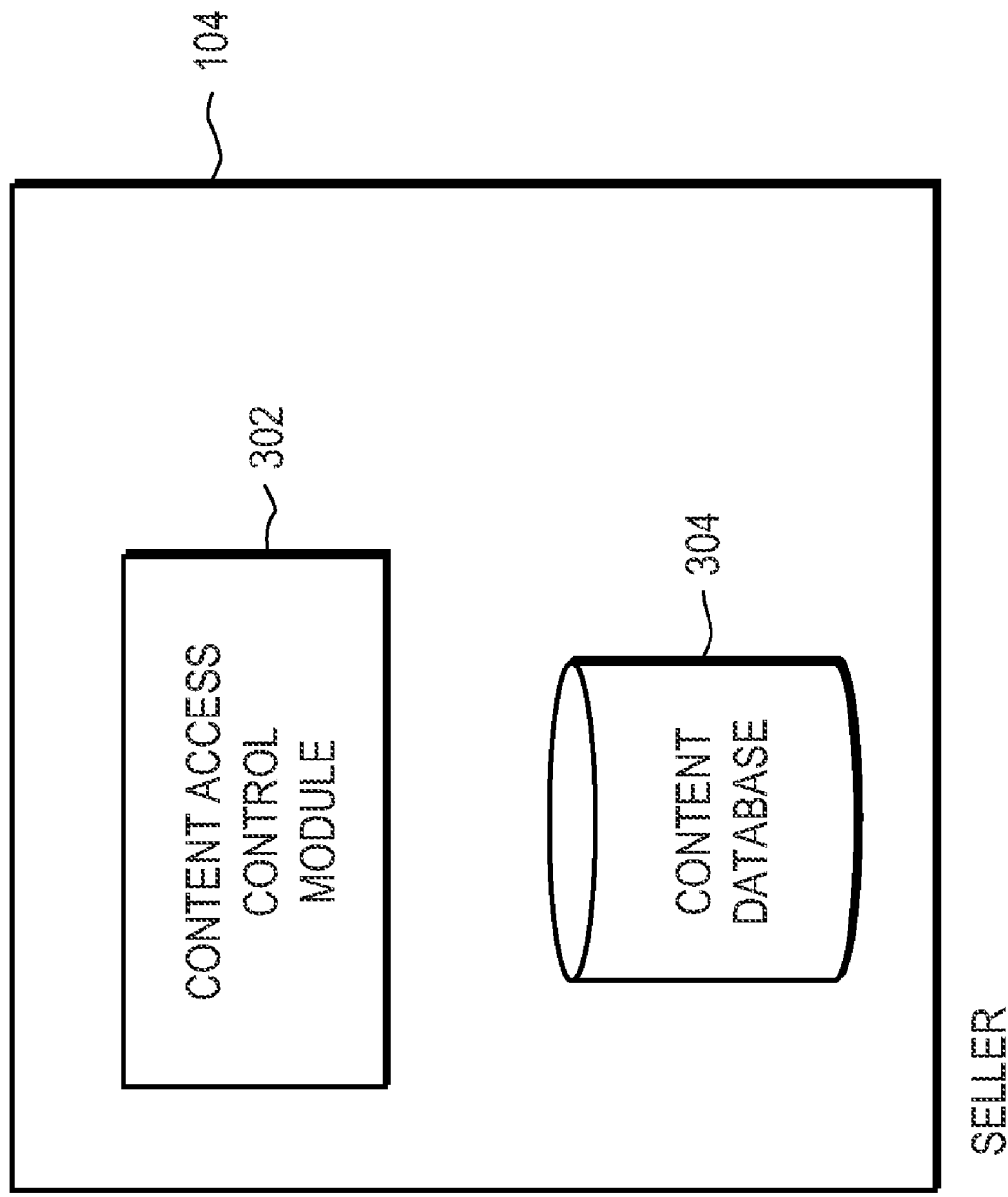
FIG. 3 is a high-level block diagram illustrating a more detailed view of a seller of FIG. 1 according to one embodiment of the present invention.

FIG. 3 is a high-level block diagram illustrating a more detailed view of the seller 104 according to one embodiment of the present invention. The seller 104 includes a content access control module 302 and a content database 304. Embodiments of the seller 104 can include other and/or different modules than the one illustrated in FIG. 3, and the functionality attributed to the module can be performed by other or different modules in other embodiments.

The content access control module 302 controls access to the content in the content database 304. In one embodiment, the content access control module 302 holds authorization and/or authentication information for the entities (e.g., buyers and/or brokers) that have access to the content. This authorization and/or authentication information can include, for example, login/password pairs, passwords that can be validated using public key cryptography techniques, and/or other data useful for authorizing and/or authenticating entities having access. If an entity seeking access provides a valid authorization and/or authentication information, the content access control module 302 grants the entity access to the content.

In one embodiment, the content access control module 302 also holds buyer information allowing the seller to personalize the purchasing experience for each buyer. This buyer information can include buyer preferences, references to items previously purchased by the buyer, recommendations for new purchases, etc. In one embodiment, the seller 104 provides buyers 102 with "cookies" that unique identify the buyers. A buyer 102 (or broker 106, on the buyer's behalf) provides the cookie to the seller 104 and the seller personalizes the experience for the buyer identified by the cookie.

The content database 304 stores content made available by the seller 104. As used herein, the term "database" refers to a collection of content and does not necessarily refer to a particular organization or structure of the content. In one embodiment, the content within the content database 304 is stored as a collection of discrete data files arranged in a directory structure. The content can include, for example, a set of one or more web pages defined by HTML and/or XML files, image files such as GIF or JPEG files, JAVASCRIPT files, etc. In addition, the content can include portable data files (PDF), executable files, text files, media files, and/or any other type of arrangement of data that is accessible using a computer network. Depending upon the embodiment, the content may or may not be protected by a digital rights management (DRM) system.

In one embodiment, a collection of related content is identified by its "realm." A realm is a reference to a location of content. A universal resource locator (URL) defines a realm. Likewise, a directory path, or partial path, defines a realm. For example, the URL "http://www.content.provider/paid-content/043ecae9k/" specifies a realm of content located on the server having the domain name "www.content.provider" and located in or below the directory structure "paid-content/043ecae9k." The following URLs refer to content within this realm:

http://www.content.provider/paid-content/043ecae9k/index.html
http://www.content.provider/paid-content/043ecae9k/thumbnail/001.gif In contrast, the following URLs refer to content outside of this realm:

http://www.content.provider/paid-content/
http://www.content.provider/paid-content/soft03ad Realms are thus a convenient way to reference content.

Figure 4:
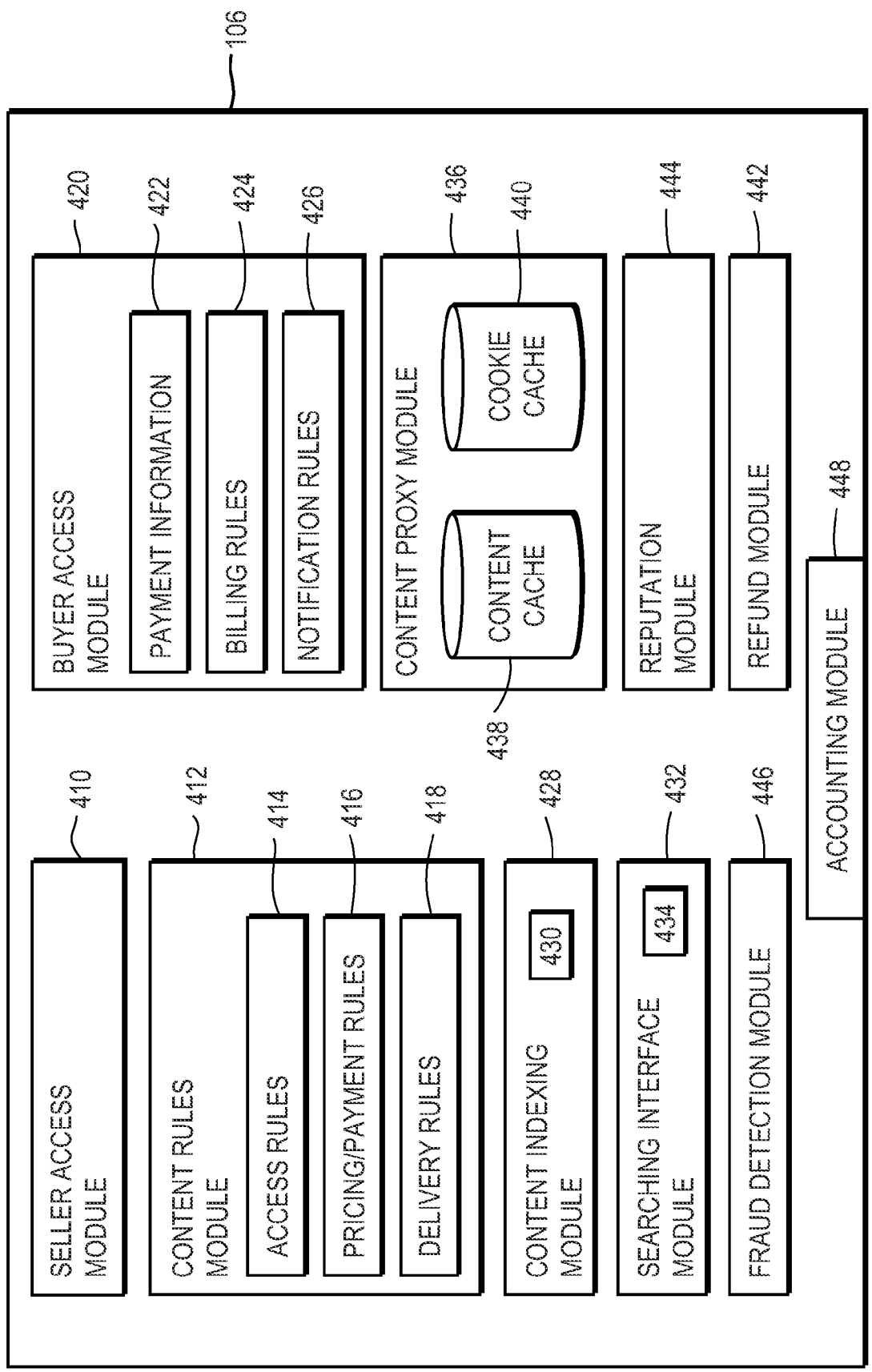

FIG. 4 is a high-level block diagram illustrating modules within the broker 106 according to one embodiment of the present invention. Embodiments of the broker 106 can include other and/or different modules than the ones illustrated in FIG. 4, and the functionalities attributed to particular modules can be performed by other or different modules in other embodiments. The modules within the broker 106 allow the broker to interact with the sellers 104, interact with the buyers 102, and process and account for the sales of content from the sellers to the buyers.

This description first focuses on the modules that allow the broker 106 to interact with the sellers 104. The broker 106 includes a seller access module 410 which allows a seller 104 to establish an account with the broker 106. In one embodiment, the seller access module 410 holds authorization and/or authentication information for the sellers 104, such as login/password pairs and/or passwords that can be validated using public key cryptography techniques. A given seller 104 provides the authorization and/or authentication information to the broker 106 in order to log into the broker 106 and provide seller-specific information. In one embodiment, the seller-specific information includes a payment mechanism (such as wire transfer address) by which the broker 106 can credit the seller 104 for access to the seller's content. The broker 106 associates the seller-specific information with the particular seller having the account. Thus, the seller access module 410 allows the creation of separate accounts, and separate sets of information, for each of the sellers 104 that are using the broker 106.

A content rules module 412 stores seller-specified rules describing the content available from each seller 104 and the terms of access to the content. In one embodiment, the content rules module 412 stores authorization and/or authentication information that allows the broker 106 to log into the content access control module 302 at the seller 104 and access the content within the seller's content database 304.

In one embodiment, the seller-specified rules include access rules 414, pricing and payment rules 416, and delivery rules 418. The access rules 414 for the content specify the terms of access to the content. The terms of access describe the content that is available, the time and/or frequency limits on the access, etc. For example, the terms of access can state that a buyer is given one time access to content per purchase. Likewise, the terms of access can state that a buyer can access purchased content for a given time period (e.g., 24 hours), can access the content in perpetuity, etc. The terms of access can also include meta-data that define the type of content and/or types of buyers for which the content is suitable. For example, the meta-data can indicate that the content is explicit in nature and suitable for adults.

In one embodiment, the access rules 414 also specify relationships between the content. In an embodiment where the content comprises web pages, the terms of access can specify that certain text and images are provided as part of the page, and/or are available to a buyer who purchases a given page. For example, if the buyer purchase a web page having a thumbnail image, the terms of access can specify that the buyer is also entitled to view a larger version of the image stored in the seller's content database 306.

The pricing and payment rules 416 specify the fees associated with accessing the content from the seller 104. Depending upon the embodiment and/or the seller 104, the fees can be based on a frequency of access, based on a time period of access, based on the types and/or amount of content accessed, and/or any other factors. For example, the pricing rules 416 can specify that a buyer is charged 0.1 cent per access to a particular piece of content. Similarly, the pricing rules 416 can specify that a buyer is charged $5/week to access all content from the seller 104. Those of skill in the art will recognize that many variations of pricing are possible.

In one embodiment, the pricing and payment rules 416 also specify the payments to be made from the broker 106 to the seller 104 in return for access to the content. In one embodiment, the fees charged to the buyer 102 are shared between the broker 106 and the seller 104 and the pricing and payment rules 416 thus specify how the fees are to be shared. The fee sharing terms can vary depending upon the buyer, seller, content being purchased, frequency that the content is purchased, or any other factors established by the broker 106 and/or seller 104. In one embodiment, the pricing and payment rules 416 specify a percentage split between the broker 106 and seller 104.

The delivery rules 418 for the content describe how content is delivered to the buyer. In one embodiment, the delivery rules 418 indicate whether particular content is cached at the broker 106 and/or whether the buyer is provided with direct access to the seller 104. In one embodiment, the delivery rules 418 indicate whether the broker 106 should obscure a source of content delivered to a buyer 102.

In one embodiment, the content rules module 412 specifies content associated within given access 414, pricing 416, and/or delivery 418 rules using realm descriptions. A realm description identifies a realm of content, and a set of access, pricing, and/or delivery rules that are applicable to the content within the realm. Other embodiments use different techniques for specifying content for which given rules are applicable.

This description next turns to the modules that allow the broker 106 to interact with the buyers 102. In one embodiment, the broker 106 includes a buyer access module 420 which allows a buyer 102 to establish an account with the broker 106. In one embodiment, the buyer access module 420 holds authorization and/or authentication information for the buyers 102, such as login/password pairs and/or passwords for use in a public key cryptography system. A given buyer 102 provides the authorization and/or authentication information to the broker 106 in order to log into the broker 106 and provide buyer-specific information. In one embodiment, the buyer-specific information includes payment information 422 (such as a credit card number) that allows the broker 106 to charge the buyer 102 for content. The broker 106 associates the buyer-specific information with the particular buyer having the account. Thus, the buyer access module 420 allows the broker 106 to establish separate accounts, and separate sets of information, for each of the buyers 102 that are using the broker. In one embodiment, the buyer-specific information includes parental-control information and the like that blocks the buyer from buying undesired content.

In one embodiment, the buyer-specific information also includes billing rules 424 for the buyer 102. The billing rules specify the billing terms for the buyer including, for example, the length of the billing cycle (e.g., weekly or monthly) and/or the minimum amount of a bill (e.g., invoice the buyer 102 when the accumulated cost of the buyer's transactions exceed $20). The billing rules can also specify a pre-approval amount (e.g., automatically approve all transactions under 10 cents, but seek approval for more costly transactions).

In one embodiment, the buyer-specific information includes notification rules 426 specifying if and/or when a buyer 102 should be notified about purchases. For example, the notification rules can specify to send an email to the buyer 102 each time the buyer purchases content, and/or to send an email when the total value of the content purchased exceeds a specified amount. Similarly, the notification rules can display a notice to the buyer 102 if the buyer attempts to purchase content having a cost above a specified limit. Other embodiments of the present invention can have different and/or other billing and notification rules than the ones described herein.

This discussion now turns to the modules that process and account for the sales of content from the sellers to the buyers. In one embodiment, the broker 106 includes a content indexing module 428 that indexes the content available from the sellers 104. In one embodiment, the content indexing module 428 uses the authorization and/or authentication information provided by the sellers 104 to log into the sellers and access the content available there. The content indexing module 428 indexes the content by keyword and/or other criteria that allow the content to be quickly identified and/or retrieved in response to a query for which the content is responsive. In one embodiment, a crawler module 430 within the content indexing module 428 methodologically identifies the content at the seller 104 by following links within the content to other content that in turn has additional links. By following the links, the crawler module 430 can identify all (or at least the linked-to subset) of the content available from the seller 104.

In one embodiment, a searching interface module 432 provides the buyers 102 with access to content searching capabilities. These capabilities allow a buyer 102 to provide the searching interface module 432 with a search query that specifies search parameters such as keywords, meta-data describing desired results, and/or other information and receive in return a list of content that at least partially satisfies the query. In one embodiment, the search query is generated implicitly based on actions performed by the buyer 102 and/or other criteria. In one embodiment, the searching interface module 432 interfaces with a search engine 434 provided by GOOGLE INC. of Mountain View, Calif. The search engine 434 searches the content indexed by the content indexing module 428 in response to search queries from buyers 102 and identifies content that satisfies the queries. In one embodiment, the search engine 434 also searches content in other domains, such as content freely available on the Internet.

The search engine 434 thus identifies a list of content that at least partially satisfies a query. In such an embodiment, the result of a query can include a mix of premium (i.e., content for sale from sellers 104) and free content. In one embodiment, sellers 104 can purchase rights to terms utilized in the search query. If the buyer 102 searches for a term purchased by a seller 104, the search engine 434 (or another module working in concert with the search engine 434) returns a reference to that seller's content to the buyer along with the other results of the search.

The searching interface module 432 presents the buyer 102 with descriptions of the content identified by the search. There are a variety of ways that the searching interface module 432 can present these search results to a buyer 102. In one embodiment, the results are presented visually. In another embodiment, the results are presented audibly. In one embodiment, the results for premium content are displayed inline with results for free content. In another embodiment, the searching interface module 432 segregates the premium content from the free content. For example, the premium content can appear as a separate results list and/or as a series of advertisements. In one embodiment, the searching interface module 432 provides a buyer 102 with an excerpt of the premium content to allows the buyer to evaluate whether purchasing the premium content is justified. In one embodiment, the searching interface module 432 provides a buyer with a reputation score for the premium content and/or seller 104 offering the content. The reputation score, which is calculated by the reputation module 444 described below, is a value indicating the relative quality of the premium content and/or the seller of the content.

In one embodiment the broker 106 includes a content proxy module for delivering content to the buyers 102. When a buyer 102 indicates a desire to purchase content, the content proxy module 436 evaluates the information and rules in the buyer access module 420 to determine whether the buyer is entitled to receive the content. If the buyer 102 is entitled to receive the content, the content proxy module 436 provides the content to the buyer.

Depending upon the embodiment, there are multiple ways that the content proxy module 436 can provide the content to the buyer 102. In one embodiment, the content proxy module 436 provides the buyer 102 with instructions for retrieving the content directly from the seller 104. These instructions can be encoded in a HTTP instruction (such as a "redirect" instruction) and/or a URL so that the content access appears seamless to the buyer 102. In another embodiment, the content proxy module 436 uses the information in the seller access module 410 and/or the content rules module 412 to retrieve the content from the seller 104 and provide it to the buyer. In one embodiment, the content proxy module 436 includes a content cache 438 for storing content retrieved from the sellers 104. When a buyer 102 purchases content that is stored in the cache 438, the content proxy module 436 provides the buyer with the cached content rather than retrieving the content from the seller 104.

In one embodiment, the content cache 438 is loaded with content when the content indexing module 428 indexes the content at the sellers 104. In another embodiment, the content cache 438 stores a copy of content when previously-uncached content is retrieved from a seller 104 in response to a purchase by a buyer 102. The content proxy module maintains coherency between the cached content and the content at the sellers 104 by occasionally evaluating the cached content and flushing stale content or using other known cache coherency techniques.

In one embodiment, the content proxy module 436 acts as an opaque proxy and obscures the true source of purchased content from the buyers 102. For example, if the true URL of content purchased by a buyer 102 is "http://premiumcontent.seller.com/premiumcontent," the content proxy module rewrites the URLs of content received by the buyer so that the content appears to come from another source such as "http://premiumcontent.broker.com/contentID." The content proxy module 436 also rewrites any URLs within the content and fixes up any relative URLs in the content as may be necessary or desired to obscure its source of origin.

In one embodiment, the content proxy module 436 includes a cookie cache 440 for maintaining cookies on behalf of buyers 102 and sellers 104. A cookie is data that unique identifies a buyer 102. In a normal web browsing scenario without a broker 106, a seller 104 can cause a buyer's web browser to store a cookie identifying the buyer to the seller. The seller 104 can use the cookie to identify the buyer 102 and customize the buyer's experience when interacting with the seller.

In one embodiment of the present invention, however, the buyer 102 and seller 104 do not directly interact and, therefore, the seller 104 cannot place or read a cookie at the buyer 102. The cookie cache 440 therefore maintains a correspondence between the buyers and the cookies issued by the sellers. When the broker 106 facilitates an interaction between a buyer 102 and a seller 104, the content proxy module 436 identifies the buyer using the information in the buyer access module 420 (and/or via a broker cookie) and identifies a corresponding cookie issued by the seller for that buyer. Then, the content proxy module 436 supplies the cookie to the seller 104. The cookie cache 440 thus allows the seller 104 to identify its buyers, but still provides anonymity on behalf of the buyers and sellers.

In one embodiment, the broker 106 includes a refund module 442 that allows buyers 102 to obtain refunds for content they have purchased. The refund module 442 includes logic specifying if and/or when a buyer 102 is entitled to a refund. For example, the logic can specify that refunds are not available for certain content, that refunds are available within a certain time period of purchase, refunds are available before the occurrence of a certain event (e.g., before the buyer's credit card is charged) etc. In one embodiment, the logic within the refund module 442 is determined by the content rules in the content rules module 412. In another embodiment, the refund logic is set by the broker 106.

In one embodiment, the refund module 442 provides a buyer 102 with an interface that allows the buyer to request refunds for eligible purchases. In one embodiment, the refund module 442 provides the buyer 102 with a web page that lists the buyer's recent transactions and allows the buyer to request refunds for given transactions. In another embodiment, the refund module 442 detects if a buyer 102 has performed an action that triggers a refund, such as selecting a "back" button of a web browser immediately after purchasing content.

In one embodiment, the refund module 442 also supports resolution of disputes between a buyer 102 and seller 104 regarding a purchase transaction. To this end, the refund module 442 provides the buyer 102 and seller 104 with web pages that collect evidence related to the dispute and then present the evidence to a third party. The third party reviews the evidence and resolves the dispute, and interacts with the refund module 442 as may be necessary or desired to effect resolution of the dispute.

In one embodiment, the broker 106 includes a reputation module 444 that provides a reputation score indicating the relative quality of content and/or the sellers 104 that provide the content. In one embodiment, the reputation score is determined automatically in response to actions that occur at the broker 106. For example, the reputation module 444 can give a higher to reputation score to content that is purchased more frequently relative to other content. Likewise, the reputation module 444 can give a higher reputation score to a seller 104 that sells more content relative to other sellers. Furthermore, the reputation module 444 can reduce the reputation score of content for which refunds are frequently requested, and/or reduce the reputation score of sellers 104 that sell frequently-refunded content. In addition, the reputation score can be determined in response to buyer input. In one embodiment the reputation module 444 provides buyers 102 with an interface with which the buyers can provide feedback and assign reputation scores to content and/or sellers. The reputation module 444 aggregates the scores assigned by the buyers 102 and calculates reputation scores for the content and/or sellers.

In one embodiment, the broker 106 includes a fraud detection module 446 for detecting potentially fraudulent usage of the broker 106. One known way to abuse the broker 106 is to establish a fraudulent seller 104 and have a buyer 102 make multiple content purchases from that seller using a stolen credit card number. In such a scenario, the operator of the fraudulent seller 104 could conceivably collect the seller's portion of the fees billed by the broker 106 to the stolen credit card. The fraud detection module 446 is adapted to detect this and other types of fraud. In one embodiment, the fraud detection module detects when a rate of transactions by a particular buyer and/or seller exceeds a certain value, such as a historical average. Such a high rate of transactions can indicate that the transactions are fraudulent. In one embodiment, when the fraud detection module 446 detects potential fraud of this type, it reacts by slowing down the rate of transactions that can be performed by the potentially-fraudulent buyer 102 and/or seller 104. If the potentially-fraudulent activity continues, the fraud detection module 446 eventually denies all transactions by the potentially-fraudulent buyer 102 and/or seller 104.

In one embodiment, an accounting module 448 monitors the transactions that occur using the broker 106, invoices the buyers according to the information in the buyer access module 420, and credits the sellers according to the information in the seller access 410 and content rules modules 412. In addition, the accounting module 448 also accounts for refunds requested and received. Thus, the broker 106 supports a micro-payment marketplace between buyers 102 and sellers 104.

In one embodiment, the accounting module 448 aggregates the purchases made by respective buyers 102 and maintains a running total of each buyer's purchases within a billing cycle. For example, if the buyer 102 purchases multiple news story at a cost of 10 cents each, the accounting module 448 maintains the sum of the buyer's purchases for the pertinent billing cycle. Information within the buyer access module 420 or elsewhere within the broker 106 specifies when to invoice (e.g., charge) the buyer 102 for the amount of the aggregate purchases, at which point the billing cycle restarts.

In one embodiment, a buyer 102 establishes credit with the broker 106 which is maintained, for example, within the buyer access module 420 and/or the accounting module 448. The accounting module 448 subtracts the buyer's purchases from the established credit. When the credit is spent, the broker 106 can charge additional credit using the buyer's payment information 442 and/or interacts with the buyer 102 to establish new payment terms.

In one embodiment, the accounting module 448 similarly aggregates the sales made by respective sellers 104 and maintains a running total of each seller's sales within a credit cycle. Information within the seller access module 410, content rules module 412, the accounting module 448, or elsewhere within the broker 106 specifies when to credit the seller 104 for the seller's share of the fees generated by the aggregate purchases, at which point the credit cycle restarts.

C. PROCESS/EXAMPLE

Figure 5:
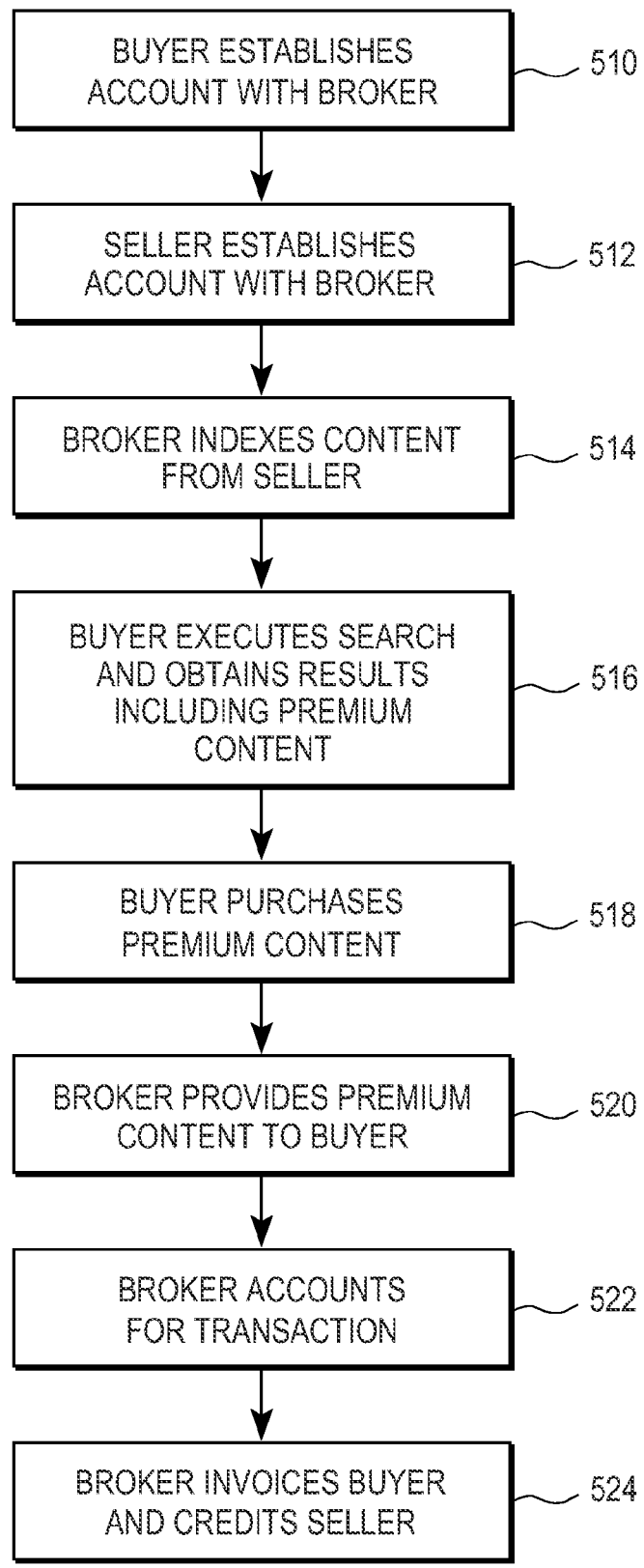
FIG. 5 is a flow diagram illustrating steps performed by buyers, sellers, and the broker according to one embodiment of the present invention.

FIG. 5 is a flow diagram illustrating steps performed by buyers 102, sellers 104, and a broker 106 according to one embodiment of the present invention. Those of skill in the art will recognize that in some embodiments the steps will not be performed in the order illustrated in FIG. 5. In addition, some embodiments will lack certain steps and/or contain different steps than the ones illustrated in FIG. 5.

At some point, a buyer 102 establishes 510 an account with the broker 106. Typically, the buyer 102 will perform this step by using a web browser to connect to a web site operated by the broker 106, set up an account, and provide a credit card number or other payment information. Similarly, at some point a seller 104 establishes an account with the broker 106. The seller 104 can also perform this step by using a web browser to connect to a web site operated by the broker 106, set up an account, and provide the content rules and other information utilized by the broker.

The broker 106 indexes 514 the content available from the seller 104. In one embodiment, the broker 106 indexes the content immediately after the seller establishes an account. In another embodiment, the broker 106 periodically indexes content from all sellers having accounts with the broker. Regardless of when the indexing occurs, at some point the broker 106 has indexed the content and incorporated the content into the universe of data that can be returned to buyers in response to search queries.

The buyer 102 uses the searching interface module 434 to execute 516 a query searching for content, such as web pages or PDF files, matching the search terms. In response, the broker 106 returns a list of search results that may include free and/or premium content. As discussed above, the search results can intermingle the free and premium content results, or the different types of results can be segregated and displayed in different manners. In addition, the premium content search results can include excerpts from the premium content. Furthermore, the premium content search results can include a graphical or textual indicator of the reputation score for the premium content and/or seller 104. In an alternative embodiments, the buyer 102 is presented with a list of premium content in response to an activity other than executing a query. For example, the buyer 102 can navigate a content directory to find the list.

The buyer 102 selects and purchases 518 content from the list presented by the broker 106. In one embodiment, the buyer 102 uses the web browser to select and "click" on a link to the content. This activity causes a URL identifying the buyer 102 and/or content to be sent from the buyer's web browser to the broker 106. This URL is received by the content proxy module 436.

The content proxy module 436 examines the information in the content rules module 412 and buyer access module 420 and determines whether the buyer 102 is allowed to access the content. For example, meta-data associated with the content might not satisfy parental control information specified by the buyer 102 and, therefore, the content proxy module 436 will deny the transaction and block access to the content. In another example, the buyer's payment information 422 and/or billing rules 424 might prevent the buyer from purchasing the content if the content is too expensive. During this process, the content proxy module 436 might also determine that the buyer 102 has already purchased the content and is allowed by the seller's access rules 414 to access the content again without charge.

If the buyer 102 is allowed to access the content, the content proxy module 436 provides 520 the content to the buyer 520. In one embodiment, the content proxy module 436 sends the buyer 102 a URL pointing to the content. Depending upon the embodiment, the URL can point to content within the content cache 438, content at the seller 104, and/or content located elsewhere on the network 108. In addition, the content proxy module 436 can configure the URL, and rewrite any URLs in the content, to obscure the true source of the content. The buyer 102 uses the URL to retrieve the content. In one embodiment, the content proxy module 436 retrieves the buyer's seller cookie from the cookie cache 440 and provides it to the seller 104 to allow the seller 104 to customize the content for the buyer.

The broker 106 invoices 522 the buyer for the purchase and credits the seller 104 for the transaction. In one embodiment, the broker 106 aggregates the charges for the buyer as specified in the buyer access module 420. When a billing condition is met, such as the total charges reaching a specified amount or the end of a billing cycle, the broker 106 invoices the buyer 102. This invoicing can occur, for example, by sending an invoice to the buyer 102, charging the buyer's credit card, etc. In another embodiment, the broker 106 separately charges the buyer 102 for each transaction (or for certain transactions). If necessary or desired, the buyer 102 can seek a refund for the transaction by interacting with the refund module 442.

In one embodiment, the broker 106 also aggregates the credits for the seller 104. When a crediting condition occurs, such as the total credits reaching a specified amount or the end of a crediting cycle, the broker 106 credits the seller 104 using the payment mechanism as specified by the seller in the seller access module 410. In another embodiment, the broker 106 credits the seller 104 during each transaction. As described above, in one embodiment the broker 106 and the seller 104 share the fees paid by the buyer 102 for the content.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A computer-implemented method comprising:
    establishing an account for a seller with a broker, the seller selling electronic content that can be purchased by buyers in payment transactions, the seller including a content database storing electronic content offered by the seller for purchase;
    storing in a storage system of the broker and separate from the content database of the seller, a copy of the electronic content offered by the seller;
    storing a rule describing terms of access to the electronic content stored in the storage system responsive to the content being purchased;
    allowing a buyer to purchase the electronic content; and
    responsive to the buyer requesting the electronic content and the buyer satisfying the terms of access of the rule, providing to the buyer the electronic content stored in the storage system.

2. The method of claim 1, wherein the rule specifies a number of times that buyers of the electronic content can receive the electronic content from the broker.

3. The method of claim 2, wherein the number is more than one.

4. The method of claim 1, wherein the rule specifies a time period within which buyers of the electronic content can request and receive the electronic content from the broker.

5. The method of claim 1, wherein the rule is specified by the seller.

6. The method of claim 1, further comprising:
    storing an additional rule describing types of buyers for which the electronic content is suitable; and
    responsive to an additional buyer not being a type of buyer for which the electronic content is suitable, denying a request from the additional buyer to purchase the electronic content.

7. The method of claim 1, further comprising:
    determining a reputation score representing the quality of content offered by the seller for purchase; and
    providing the reputation score to the buyer.

8. The method of claim 1, further comprising:
    storing payment information describing the purchase of the electronic content by the buyer;
    invoicing the buyer using the payment information according to a billing rule specifying a billing term of the buyer; and
    notifying the buyer of the purchase according to a notification rule describing when the buyer is to be notified of purchases.

9. The method of claim 1, further comprising:
    storing a cookie issued by the seller to the buyer; and
    providing the cookie to the seller responsive to the buyer interacting with the electronic content.

10. A computer-implemented method comprising:
    establishing an account for a seller with a broker, the seller selling electronic content that can be purchased by buyers in payment transactions, the seller including a content database storing electronic content offered by the seller for purchase;
    storing in a storage system of the broker and separate from the content database of the seller, a copy of the electronic content offered by the seller;
    storing a rule specifying that buyers of the electronic content are to be provided with access to additional content associated with the electronic content; and
    responsive to a buyer purchasing the electronic content, providing to the buyer the electronic content stored in the storage system and according to the rule, providing the buyer with access to the additional content.

11. The method of claim 10, wherein the additional content is a different version of the electronic content.

12. The method of claim 10, wherein the rule is specified by the seller.

13. The method of claim 10, further comprising:
    storing an additional rule describing types of buyers for which the electronic content is suitable; and
    responsive to an additional buyer not being a type of buyer for which the electronic content is suitable, denying a request from the additional buyer to purchase the electronic content.

14. The method of claim 10, further comprising:
    determining a reputation score representing the quality of content offered by the seller for purchase; and
    providing the reputation score to the buyer.

15. The method of claim 10, further comprising:
    storing payment information describing the purchase of the electronic content by the buyer;
    invoicing the buyer using the payment information according to a billing rule specifying a billing term of the buyer; and
    notifying the buyer of the purchase according to a notification rule describing when the buyer is to be notified of purchases.

16. The method of claim 10, further comprising:
    storing a cookie issued by the seller to the buyer; and
    providing the cookie to the seller responsive to the buyer interacting with the electronic content.

17. A computer-implemented method comprising:
    establishing an account for a seller with a broker, the seller selling electronic content that can be purchased by buyers in payment transactions, the seller including a content database storing electronic content offered by the seller for purchase;
    storing in a storage system of the broker and separate from the content database of the seller, a copy of the electronic content offered by the seller;

responsive to a buyer purchasing the electronic content, providing to the buyer the electronic content stored in the storage system; and providing a fee to the seller based on the purchase of the electronic content by the buyer.

18. The method of claim 17, wherein the fee is a percentage of a payment obtained based on the purchase of the electronic content by the buyer.

19. The method of claim 17, wherein the fee is determined based on a frequency in which the electronic content is purchased by buyers.

20. The method of claim 17, further comprising:

storing payment information describing the purchase of the electronic content by the buyer;

invoicing the buyer using the payment information according to a billing rule specifying a billing term of the buyer; and notifying the buyer of the purchase according to a notification rule describing when the buyer is to be notified of purchases.

* * * * *